United States Patent Office 2,699,612
Patented Jan. 18, 1955

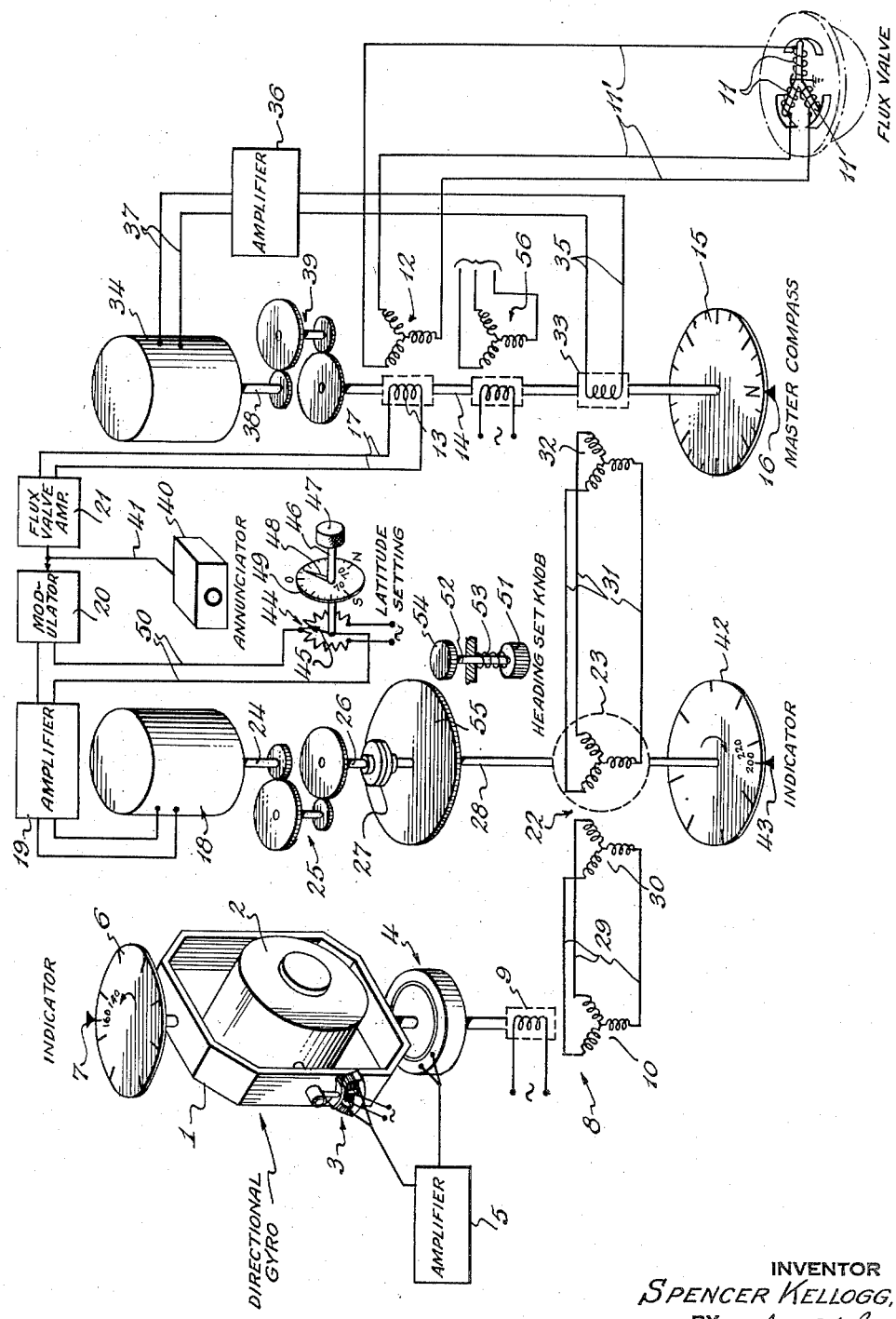

2,699,612

AZIMUTH DATA PROVIDING SYSTEM FOR DIRIGIBLE CRAFT

Spencer Kellogg 2nd, Glen Head, N. Y., assignor to The Sperry Corporation, a corporation of Delaware Application January 31, 1950, Serial No. 141,439

15 Claims. (Cl. 33—222)

This invention relates to an azimuth data providing system for dirigible craft that particularly utilizes control elements in the form of a free directional gyroscope and a magnetic compass or means sensitive to the directivity of the horizontal component of the earth's magnetic field, by which the random wandering of the directional gyroscope is prevented from causing errors in the compass card. The system may be employed to operate a master azimuth indicator and a number of repeater azimuth indicators as well as provide data for the operation of an automatic pilot controlling the craft about its yaw axis.

The performance of directional gyroscopes used as compasses for aircraft has been greatly improved by automatically correcting the gyroscope for random wandering by a magnetic compass or other field responsive device such as a flux valve, such as described in U. S. Patent 2,383,461, issued to O. E. Esval, on August 28, 1945. For great accuracy, however, I prefer to also correct the directional gyroscope for apparent drift due to the earth's rotation, which, of course, varies with the sine of the latitude, since if the gyroscope is corrected only from a magnetic compass the gyroscope would have a slight residual error due to its continuous drift in one direction away from the meridian due to the earth's rotation. With the earth's magnetic field responsive device included in the system, a navigation instrument is provided that is particularly useful over regions of the earth where there is relatively small magnetic variation. Over the earth's polar region where magnetic variation is high, the system remains useful without the earth's magnetic field responsive device, the compass then being operated only by the inputs to the system's differential from the directional gyroscope and the latitude control. As the latitude correction for the system is a function of the sine of the latitude of the craft, the correction is of particularly large magnitude when the craft is over the polar region of the earth.

I also prefer to introduce both the compass correction and the latitude correction without disturbing the gyroscope by correcting the output or reading of the gyroscope rather than the position of the gyroscope itself. Such a system with respect to compass corrected directional gyroscopes or gyro-magnetic compasses is broadly suggested in Fig. 2 of the patent to Sperry 1,982,702, dated December 4, 1934.

With the improved system, the necessity under starting conditions for aligning the gyroscope and compass has been eliminated. The need of a caging and resetting mechanism for the gyroscope of the system is avoided.

Other advantages, features and structural details of the invention will become apparent from the following description of the same with reference to the accompanying drawing which shows a single schematic view and wiring diagram of the improved system.

As shown in the drawing, the gyroscopic reference element of the system is a directional gyroscope suitably mounted on the craft with the gimbal ring 1 thereof provided with complete freedom about its vertical axis. The gyroscope further includes a conventional rotor case 2 pivotally supported on ring 1 with freedom about a horizontal axis. The gyroscopic rotor (not shown) within the case 2 is mounted to spin about a normally horizontal axis perpendicular to the axes of both the case 2 and ring 1. Suitable motive means (not shown) are provided to drive the rotor of the directional gyroscope. As shown, the reference instrument is provided with a suitable means for maintaining the case in a level condition so that the spin axis of the rotor thereof remains in a substantially horizontal position. The levelling means provided, in the present instance, includes an E-type electrical pick-off that detects tilt of the case 2 about its horizontal axis relative to the ring 1. The armature of pick-off 3 is fixedly connected to the case 2 and the wound pole piece of the pick-off is fixedly mounted on the ring 1. The output of the pick-off 3 is utilized to control the operation of a conventional torque motor 4 by way of amplifier 5. The motor 4 is effective to exert a torque about the axis of the ring 1 to precess the case and restore the same to a level condition. The gyroscope shown also includes an indicator in the form of a card 6 fixed to the ring 1. Card 6 is graduated in degrees and is read in connection with an index 7 fixed to the craft. The gyroscope of the system is unique in that there is no torquing device effective about the horizontal axis of the case 2 and that consequently the gyroscope is free to drift about its vertical axis due to the random wandering effect thereon of the earth's rotation at the latitude of the craft. As the gyroscope is free to drift about its vertical axis, the card 6 and index 7 do not provide an indication of the azimuth position or heading of the craft such as is the case in the flux valve compass system referred to in the hereinbefore noted U. S. Letters Patent. The card 6 and index 7 provide an indication that is useful in explaining the operation of the improved system as hereinafter described. The system, as shown, is provided with data corresponding to the indication of the card 6 and index 7 by a signal providing means in the form of an electrical signal generator or transmitter 8 such as a selsyn pick-off whose rotor 9 is fixedly connected to the ring 1 of the gyroscope and whose stator 10 is fixed to the craft. As shown, the rotor 9 of the signal generator is energized from a suitable alternating current source of electrical energy. When the system is used in an aircraft, the directional gyroscope may be stabilized so that the ring 1 is maintained in a vertical position regardless of the bank or pitch attitude of the craft. This may be done by mounting the directional gyroscope directly on the rotor case of a suitable gyroscopic vertical (not shown).

The other reference element of the system is provided by a magnetic compass or means sensitive to the horizontal component of the earth's magnetic field, by means of which the straying or random wandering of the gyroscope due to bearing friction, and the like is prevented from reaching the master indicator or card 15. This element is shown in the form of a three legged flux valve of the character described in the above mentioned U. S. Letters Patent No. 2,383,461. The flux valve is located in a position on the craft that is relatively free from magnetic disturbances. The output coils 11 on the respective legs of the flux valve are connected by suitable leads 11' to the three phase stator of a signal generator such as a selsyn device 12 whose wound rotor part 13 is fixedly mounted on a shaft 14. The indicator for the system is shown in the form of a master compass having relatively movable card 15 and index 16. The shaft 14 is connected to move one of the elements while the other element is fixed to the craft. As herein shown, the shaft drives a compass card 15 and the index 16 readable therewith is fixed to the craft. The same indication would be obtained if the index were a pointer fixed to shaft 14 and the card 15 were fixed in position on the craft. The stator part of the electrical signal means or selsyn device 12 is fixed to the craft and operatively connected to the magnetic field responsive device or flux valve 11 by way of leads 11'.

Between the output of the selsyn device 12 and the output of the directional gyroscope as represented by the selsyn 8 is interposed a differential or comparison instrument of the synchro generator or inductive signal generator type by which the master compass card 15, controlled from the position of the directional gyroscope, is slowly corrected for deviation from the magnetic meridian due to random wandering as well as the slow deviation of the directional gyroscope due to the rotation of the earth. As shown, this arrangement includes a motor 18, amplifier 19 modulator 20 controlled in part from the output of the selsyn device 12 through amplifier 21. An input is also provided motor 18 from the latitude setting potentiometer 45 as hereinafter described. Motor 18 controls the position of one of the elements of the illustrated electrical differential or compensating signal generating means. The first of these inputs is provided from the directional gyroscope by way of selsyn 8. Motor 18 mechanically turns the shaft 28 through reduction gearing 25 and slip friction connection 27, the motor in turn being operated by (2) the input from the flux valve through device 12 and (3) the input from the latitude signal means from potentiometer 45. The gear reduction factor of gearing 25 is made quite large so as to effectively integrate the output of the flux valve so that temporary errors of the magnetic compass will not appear on the master card 15. The output of the differential 22 provides azimuth data in accordance with the teaching of the present invention. As shown, the output of the differential is fed by way of leads 31 to an electrical receiver 32 of the selsyn type whose rotor 33 is fixedly connected to the shaft 14. Upon operation of the motor 18 by a signal from the flux valve amplifier 21, the motion of shaft 24 is transmitted to the rotor 23 of the differential by way of reduction gears 25, shaft 26, slip friction connection 27 and shaft 28 so that the normal balance maintained in the self-synchronous data transmission system formed of transmitter 8, differential 22 and receiver 32 is unbalanced and a signal appears at the rotor 33 of the receiver. The signal at the rotor 33 is fed to motive means in the form of an electric motor 34 by way of leads 35 to amplifier 36, and from the amplifier to the motor by way of leads 37. Motor 34, as shown, drives shaft 38 which is connected to shaft 14 by way of reduction gearing 39, which has a far less reduction factor than gearing 25. Shaft 14 turns with the rotor 13 of the receiver 12 until the output signal of device 12 is restored to null and there is no input to drive motor 18 from the flux valve amplifier 21. The data transmission system is simultaneouly restored to a balanced condition and as there is no signal from rotor 33 the motor 34 stops operating.

The annunciator indicated at 40 is energized by the output of the amplifier 21 by way of lead 41. The annunciator provides a visual indication of the sense of the output of the amplifier 21. It also indicates when the output of the amplifier is null. This device, as employed in the system, may be of the construction specifically shown in Figs. 5, 6 and 7 of copending application Serial No. 612,189, filed August 23, 1945, now Patent No. 2,574,471 granted November 13, 1951, for Gyro-Magnetic Compasses by Caesar F. Fragola.

An indicator similar to the indicator at the directional gyroscope may be operated by shaft 28. As shown, card 42 graduated in degrees is connected to the shaft 28 and the index 43 readable therein is fixed to the craft.

The improved system also includes means for compensating for the drift of the directional gyroscope about its vertical axis due to the effect thereon of the earth's rotation at the latitude of the craft. The compensating means shown provides a signal in accordance with the latitude of the craft that is used in operating motor 18 of the system. As shown, the signal is provided by a center-tapped potentiometer whose slider 45 fixed to shaft 46 is positioned in accordance with the setting of knob 47. The knob 47 is set so that the pointer 48 on shaft 46 is positioned on the latitude graduated card 49 in accordance with the actual latitude of the craft. The potentiometer is energized by a suitable source of A. C. electrical energy and its output signal proportional to the latitude of the craft is fed to motor 18 by way of leads 50 in series with the output of modulator 20. The system thus combines the outputs of both the drift compensating means and the device 12 to control the operation of motor 18. The output of the differential 22 appearing at the rotor 33 of selsyn 32 operates motor 34 of the system to control the master compass card 15.

A heading set knob of the push-in type is shown as a means for modifying the heading of the craft relative to the reference established by the system to enable the craft to change headings as desired. The knob is indicated at 51. Knob 51 turns on a shaft 52 that is normally situated in an out position by means of a spring 53. In use, the knob 51 is pushed inwardly to engage gears 54 and 55. Turning motion of the knob then moves shaft 28 on which the rotor 23 of the differential is located. This movement is permitted due to the slip friction connection 27 between shafts 28 and 26.

In addition to controlling a master compass as indicated, the system may provide azimuth data for operating repeater compasses or an automatic pilot by means of a suitable data transmitter such as the selsyn device designated at 56.

The correction of the gyroscope for drift due to the earth's rotation is obtained by the compensating means through motor 18 which causes rotation of the rotor 23 of the differential at a rate that is equal and opposite to the drift of the gyroscope due to earth's rotation for a given latitude. Card 42 and card 6 consequently move in opposite directions at the same rate and the output of the differential remains uninfluenced by the continuous drift of the gyroscope because it is continuously compensated for. The stabilizing effect on the system of the gyroscope is consequently retained in spite of the fact the gyroscope is free to drift about its vertical axis. The adjustment for latitude is set manually into the system so that the correction is preferably made as the latitude of the craft changes. The output of the differential provides azimuth data which is a combination of the inputs from both the directional gyroscope corrected for earth's rate and the selsyn device 12.

To change the heading of the craft with the system employing a master compass only, the heading set knob 51 is pushed in so that gears 54 and 55 engage. The knob is turned and the craft is steered while observing the master compass and annunciator until the desired magnetic heading is reached with the proper compass card designation adjacent the index 16 and with the annunciator showing there is no output from the amplifier 21. The card 15 turns due to the movement of rotor 23 by knob 51 which provides an output from receiver 32 to drive shaft 14 to establish the new heading. In this procedure the input from the gyroscope to the differential is not altered nor is the latitude setting changed.

With proper correction for earth's rate and with cards 6 and 42 moving in opposite directions at equal rates, the sum of the readings thereof remains constant and corresponds to the indicated azimuth heading of the craft shown on the master compass. A compass heading of 60 degrees at a given instant, may be provided by a corresponding total indicated reading of card 42 at 36 degrees relative to index 43 and card 6 at 24 degrees relative to index 7. An hour later after the gyroscope may have drifted 2 degrees about its vertical axis, the same compass heading is provided by a reading of 38 degrees on card 42 relative to index 43 and a reading of 22 degrees on card 6 relative to index 7. This clearly demonstrates the action of the compensating means of the system as reflected in the movement of the card 42.

The master compass card 15 of the system is primarily controlled from the directional gyroscope which maintains its position in azimuth, neglecting the corrections for latitude and random wandering. With any deviation of the craft from the established azimuthal reference provided by the gyroscope, a signal is generated at selsyn 32 actuating the motor 34 which turns the card as fast as the craft changes its position in azimuth. The noted corrections are included in the system through motor 18, large reduction gearing 25 and differential 22 particularly so that due to integration temporary deviations of the magnetic compass do not appear on the master compass 15. However, as the corrections are effective over a long period of time, the master compass is controlled from a true magnetic reference over that portion of the earth's surface where there is relatively small magnetic variation. In the polar regions where magnetic variation is large, the system is best operated without the flux valve correction, the relatively large latitude correction for the earth's rotation in such regions being solely compensated for by the output of the potentiometer 44.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a system providing azimuth data for a dirigible craft, the combination of, a free directional gyroscope, means sensitive to the directivity of the earth's magnetic field, a signal device for compensating for the effect of the earth's rotation on the free directional gyroscope at the latitude of the craft, a self-synchronous data transmission system including an electrical signal generator having a rotor positioned by the directional gyroscope, an electrical differential connected to said generator having a rotor, an electrical signal receiver responsive to the output of said differential and including a rotor, a second electrical signal generator having a stator operatively connected to said field sensitive means and a rotor, motive means for driving the rotor of said differential operated by the signals of said signal device and said second signal generator, and second motive means driven by the output of said signal receiver operatively connected to the rotor of said receiver and to the rotor of said second signal generator to zero the outputs thereof.

2. A system as claimed in claim 1, having a heading set knob connected to the rotor of the electrical differential, and a compass indicator having relatively movable card and index elements, the movable element being driven by said second motive means.

3. A system as claimed in claim 1, having a compass indicator with relatively movable card and index elements, the movable element being driven by said second motive means.

4. A system as claimed in claim 1, having an indicator with relatively movable pointer and index elements, the movable element of said indicator being driven by said first motive means.

5. A system as claimed in claim 1, having two indicators with relatively movable pointer and index elements, the movable element of one of said indicators being driven by said first motive means and the movable element of the other of said indicators being driven by said second motive means.

6. A system providing azimuth data for a dirigible craft comprising, a flux valve, a first electrical signal means having a stator connected to said flux valve and a rotor, a directional gyroscope with freedom about its vertical axis, second electrical signal means having a rotor fixed to the gyroscope and a stator fixed to the craft, a third signal means for generating a signal in accordance with the latitude of the craft to compensate the system for the effect of the earth's rotation on the directional gyroscope, motive means responsive to said first and third signals, a second motive means, a comparison signal system whose output operates said second motive means having an input from said second signal means, and an input from said first motive means, and an azimuth data shaft actuated by said second motive means connected to the rotor of said first signal means.

7. A system providing azimuth data for a dirigible craft comprising a reference device sensitive to the earth's magnetic field, an azimuth data shaft, first signal means having a part fixed to said shaft and a part operatively connected to said reference device, a directional gyroscope with freedom about its vertical axis, second signal means having a part fixed to said gyroscope and a part fixed to the craft, motive means responsive to the signal of said first signal means; a differential having an input from said motive means, an input from said gyroscopic signal means, and an output; a correction device for compensating said differential for the drift of the free gyroscope due to the earth's rotation, a latitude setting knob therefor and second motive means responsive to the output of said differential operatively connected to the part of said first signal means fixed to said shaft.

8. A system providing azimuth data for a dirigible craft comprising a magnetic compass, an azimuth data shaft, first signal means having a part fixed to said shaft and a part operatively connected to said magnetic compass, a directional gyroscope with freedom about its vertical axis, second signal means having a part fixed to said gyroscope and a part fixed to the craft, means for providing a third signal in accordance with the latitude of the craft to correct the system for drift of the free gyroscope due to the earth's rotation; first motive means responsive to the signals of said first and third signal means; a differential having an input from said motive means, an input from said gyroscopic signal means, and an output; and second motive means responsive to the output of said differential operatively connected to the part of said first signal means fixed to said shaft.

9. A system providing azimuth data for a dirigible craft comprising, a flux valve, a first electrical signal means having a stator connected to said flux valve and a rotor, a directional gyroscope with freedom about its vertical axis, second electrical signal means having a rotor fixed to the gyroscope and a stator fixed to the craft, motive means responsive to the signal of said first signal means; a synchro generator system having an input from said motive means, an input from said gyroscopic signal means, and an output; means for compensating said synchro generator system for the drift of the free gyroscope due to the earth's rotation, and second motive means responsive to the output of said synchro generator system operatively connected to the rotor of said first signal means.

10. A system providing azimuth data for a dirigible craft comprising, a flux valve, a first electrical signal means having a stator connected to said flux valve and a rotor, a directional gyroscope with freedom about its vertical axis, second electrical signal means having a rotor fixed to the gyroscope and a stator fixed to the craft, means for providing a third electrical signal in accordance with the latitude of the craft to correct the system for drift of the free gyroscope due to the earth's rotation, first motive means responsive to the signals of said first and third signal means; a synchro generator system having an input from said motive means, an input from said gyroscopic signal means, and an output; and second motive means responsive to the output of said synchro generator system operatively connected to the rotor of said first signal means.

11. An azimuth reference system for dirigible craft, comprising a directional gyroscope subject to errors due both to the horizontal component of the earth's rotation and random wandering, signal means operated by said directional gyroscope, a master compass shaft; earth's rate error correcting means including a device settable in accordance with latitude, and signal means operated by said device; a random wander error correcting means including a magnetic compass, and means controlled by said compass for producing a signal upon a change in the position of the compass shaft with respect to the magnetic meridian, motive means responsive to the combined signals of said earth's rate and random wander correcting means, an electrical differential having an input from said gyroscopic signal means, an input from said motive means and an output element on the master compass shaft, and second motive means for positioning said shaft responsive to the output of said differential.

12. An azimuth reference system for mobile craft as claimed in claim 11, including an indicator operated by said first motive means in accordance with earth's rate and random wander errors.

13. A system as claimed in claim 11, including a slip friction connection between said first motive means and said differential, and a heading knob engageable with the output side of said slip friction connection.

14. In a system providing azimuth data for a dirigible craft, the combination of, a directional gyroscope with freedom about its vertical axis, electrical signal means having a rotor fixed to the gyroscope and a stator fixed to the craft, means for providing a second electrical signal in accordance with the latitude of the craft to correct the system for apparent drift of the free gyroscope due to the earth's rotation, motive means responsive to the signal of said second electrical signal means, a compass card, a synchro generator system having an input from said motive means, an input from said gyroscopic signal means, and an output element connected to said compass card, second motive means operatively connected to said card responsive to the output element of said synchro generator system to provide a third electrical signal upon deviation of said card from the magnetic heading, and means whereby said third signal may also control said first mentioned motive means.

15. A system providing compass heading for a dirigible craft comprising, a flux valve, a first electrical signal means having a stator connected to said flux valve and a rotor, a directional gyroscope with freedom about its vertical axis, second electrical signal means having a rotor fixed to the gyroscope and a stator fixed to the craft, a third signal means for generating a signal in accordance with the latitude of the craft to compensate the system for the effect of the earth's rotation on the directional gyroscope, motive means responsive to said first and third signals, a second motive means, a comparison signal system, the output of which operates said second motive means and having an input from said second signal means and an input from said first motive means, and a compass card actuated by said second motive means to which the rotor of said first signal means is connected.

References Cited in the file of this patent

UNITED STATES PATENTS

| Number | Name | Date |
|---|---|---|
| 2,414,128 | Sinks | Jan. 14, 1947 |
| 2,555,328 | Esval et al. | June 5, 1951 |
| 2,611,191 | Noxon et al. | Sept. 23, 1952 |

FOREIGN PATENTS

| Number | Country | Date |
|---|---|---|
| 576,412 | Great Britain | Apr. 12, 1934 |
| 49,251 | France | Nov. 12, 1938 |
|  | (1st addition to No. 793,301) | |
| 586,506 | Great Britain | Mar. 20, 1947 |